United States Patent [19]

Harriett

[11] Patent Number: 4,534,926

[45] Date of Patent: * Aug. 13, 1985

[54] UNINHIBITED BENTONITE COMPOSITION

[75] Inventor: Todd D. Harriett, Chicago, Ill.

[73] Assignee: American Colloid Company, Skokie, Ill.

[*] Notice: The portion of the term of this patent subsequent to Aug. 13, 2002 has been disclaimed.

[21] Appl. No.: 604,990

[22] Filed: Apr. 27, 1984

Related U.S. Application Data

[63] Continuation-in-part of Ser. No. 443,225, Nov. 22, 1982.

[51] Int. Cl.$^3$ ............................. C08K 3/34; C08J 3/18
[52] U.S. Cl. ..................................... 264/281; 106/33;
106/285; 264/407; 264/210.2; 405/128;
405/263; 405/267; 405/270; 524/445; 524/446;
524/477; 524/490; 524/491; 524/574
[58] Field of Search ............... 524/447, 574, 445, 446,
524/477, 490, 491; 106/33, 285; 405/128, 263,
267, 270; 264/281, 40.7, 210.2

[56] References Cited

U.S. PATENT DOCUMENTS

| | | | |
|---|---|---|---|
| 3,243,328 | 3/1966 | Britton et al. | 264/281 |
| 3,454,695 | 7/1969 | Holmgren | 264/281 |
| 4,010,235 | 3/1977 | Yardley et al. | 428/340 |
| 4,016,135 | 4/1977 | Takahashi et al. | 524/485 |
| 4,189,418 | 2/1980 | Ueno et al. | 524/447 |
| 4,316,833 | 2/1982 | McGroaty | 523/177 |
| 4,366,284 | 12/1982 | Ishido et al. | 524/447 |

FOREIGN PATENT DOCUMENTS 0126429  9/1980  Japan ..................... 264/281

OTHER PUBLICATIONS

C.A. 99-195819(y) Khunova et al., "Plasty Kauc" 1982 19(6).
C.A. 90-110526(s) 1979, Kuo et al.
C.A. 70-116903(w) 1969, Maloney et al.

Primary Examiner—Herbert J. Lilling
Attorney, Agent, or Firm—Mason, Kolehmainen, Rathburn & Wyss

[57] ABSTRACT

The present invention relates to a nonhydrated bentonite intimately contacted with a polypropene, polybutene, or mixtures thereof to provide a formable and shapable non-aqueous bentonite composition particularly useful as a water barrier. The bentonite composition can be extruded in the form of a rope, rod, sheet or the like and is sufficiently tacky for adherence to a wall or conduit, floor or roof in areas of potential water flow to prevent the seepage of water through the bentonite composition. In one embodiment, the bentonite composition includes a polypropene and a polybutene and an elastomer, such as butyl rubber, having sufficient resilience to stretch or expand with the expanding bentonite upon hydration and to aid in maintaining the structural integrity and cohesiveness of the composition. In another embodiment, the composition comprises bentonite, an elastomer, and any plasticizer compatible with the elastomer.

18 Claims, 6 Drawing Figures

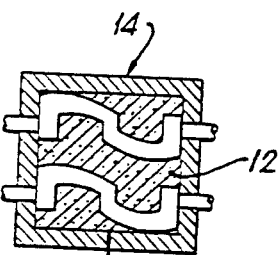
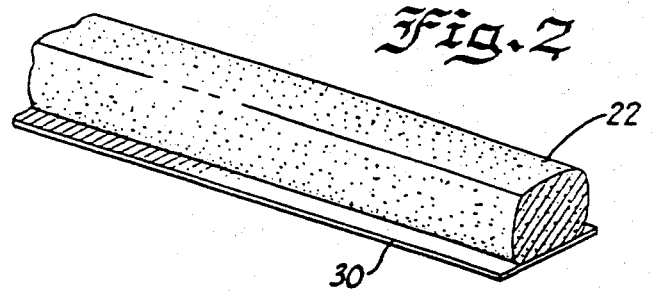
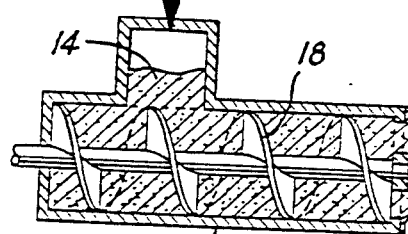
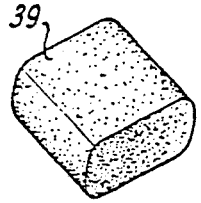
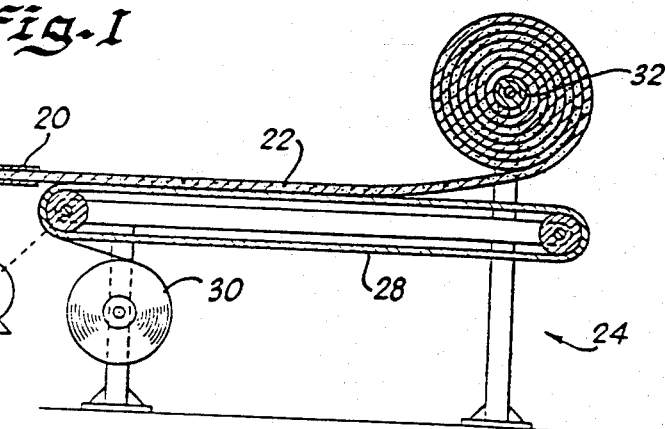
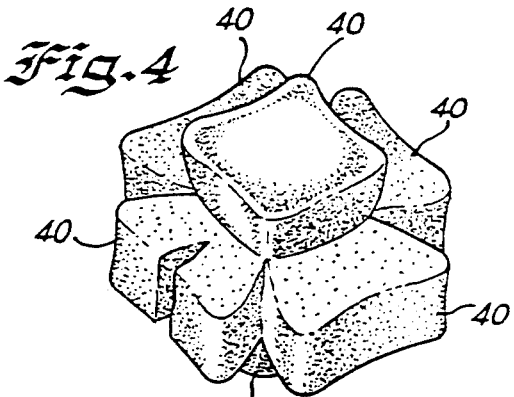
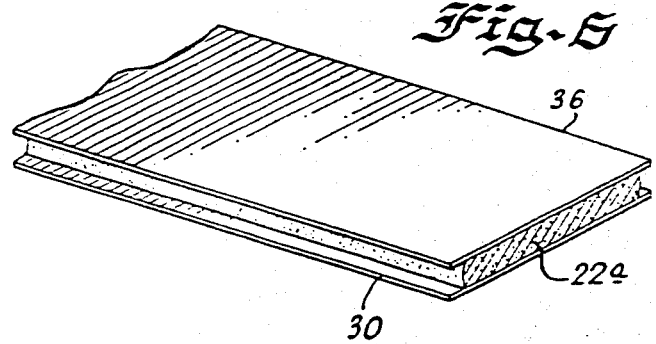
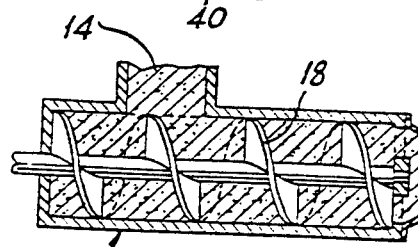
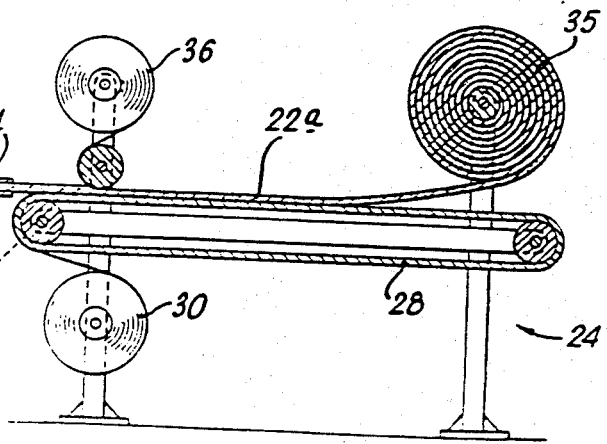

UNINHIBITED BENTONITE COMPOSITION

CROSS REFERENCE TO RELATED APPLICATION

This application is a continuation-in-part of application Ser. No. 443,225, filed Nov. 22, 1982.

FIELD OF THE INVENTION

The present invention relates to a cohesive, fully expandable, non-hydrated bentonite composition capable of expanding upon hydration outwardly from every surface in a new an unexpected manner while maintaining the cohesive integrity of the composition. More particularly, the present invention comprises a non-hydrated bentonite intimately contacted, in one embodiment, with a polypropene, polybutene, or mixtures thereof to provide a formable and shapable non-aqueous bentonite composition particularly useful as a water barrier. The bentonite composition can be extruded in the form of a rope, rod, sheet or the like and is sufficiently tacky for adherence to a wall or conduit, floor or roof in areas of potential water flow to prevent the seepage of water through the bentonite composition. In one embodiment, the bentonite composition includes an elastomer such as butyl rubber having sufficient resilience to stretch or expand with the expanding bentonite upon hydration and to aid in maintaining the structural integrity and cohesiveness of the composition.

BACKGROUND OF THE INVENTION

Many attempts have been made to provide a bentonite composition having sufficient cohesiveness and structural integrity to provide a modeling clay-like or putty-like consistency. Such bentonite compositions can be in a paste or putty-like form for handleability so that a desired quantity can be applied in a selected location for water seepage control. A major problem associated with attempting to provide a bentonite composition with a paste or putty-like consistency in order to provide the desired handleability is that many additives used to provide such consistency interfere with the swelling capacity of the bentonite. One attempt to provide a bentonite composition with a putty-like consistency is described in the Bechtner U.S. Pat. No. 2,277,286 wherein water is added to the bentonite to hydrate a portion of the bentonite to achieve the desired consistency. The resulting composition is a putty-like mass which is sufficiently cohesive as a result of the partial swelling of the bentonite, but the swellability of the bentonite is substantially retarded since only about 70-80% of its potential absorbing and swelling characteristics are retained. Further, the Bechtner mass will only adhere to surfaces so long as it remains moist.

Other attempts have been made to provide a bentonite composition having a handleable consistency such as in a paste-like or putty-like form while retaining the full swelling properties of the bentonite by the addition of non-aqueous liquids, such as set forth in this assignee's prior U.S. Pat. No. 4,279,547 and the McGroarty U.S. Pat. No. 4,316,833. Generally, the addition of liquid organic additives to bentonite will inhibit the swelling capacity of the bentonite to various degrees depending on the characteristics of the organic additive, and most notably dependent upon the polarity of the organic additive. In accordance with the McGroarty U.S. Pat. No. 4,316,833, an attempt is made to provide a cohesive bentonite composition having a paste-like consistency without hydrating the bentonite by the addition of adhesive agents, such as hydrocarbon resins. In accordance with the McGroarty U.S. Pat. No. 4,316,833 "if the adhesive penetrates the bentonite, it will destroy the ability of the bentonite to swell and thus will destroy its waterproofing capabilities". In an attempt to prevent the adhesive agent penetration, the McGroarty bentonite is first saturated with a liquid fluidizer, such as mineral spirits, to prevent the adhesive agent from substantially penetrating the bentonite particles after saturation with the liquid fluidizer.

This assignee's prior U.S. Pat. No. 4,279,547 describes another attempt to provide a bentonite composition having a consistency for good handlability such as a stiff putty-like consistency without hydrating the bentonite and without saturation of the bentonite with bentonite-inhibiting organics by forming a gel and adding the bentonite to the gel to prevent bentonite saturation while maintaining its swellability.

The Ishido U.S. Pat. No. 4,366,284 discloses a bentonite composition having 10-40% rubber, 10-40% plasticizer and 10-20% silicic filler. The silicic filler in an amount of at least 10% by weight is disclosed to be critical for swellability. In accordance with the present invention, it has been found that the compositions of the present invention achieve substantially increased swellability so long as the composition contains essentially no silicic filler.

It has been found that the composition set forth in this assignee's prior U.S. Pat. No. 4,279,547 and in the McGroarty U.S. Pat. No. 4,316,833, while generally satisfactory in terms of composition consistency and maintenance of swellability, inhibit the swelling of the bentonite to a limited extent. In accordance with the present invention, it has been found that bentonite intimately admixed with polypropene, polybutene, or mixtures thereof will form a bentonite composition having a paste-like or putty-like consistency; sufficient tack to be adhered to a wall, floor, roof, conduit and the like; and most suprisingly and unexpectedly will increase the swelling capacity of the bentonite. In accordance with another embodiment of the present invention, a cohesive bentonite composition includes bentonite, an elastomer, and a plasticizer compatible with the elastomer.

SUMMARY OF THE INVENTION

In brief, the present invention is directed, in one embodiment, to a non-hydrated, bentonite composition comprising an intimate mixture of bentonite clay with polypropene, polybutene, or mixtures thereof. In accordance with another embodiment of the present invention, an elastomer such as partially cross-linked butyl rubber is included in the composition. The elastomer has sufficient resiliency to stretch upon hydration of the bentonite and adds structural integrity to the bentonite composition. With and without the elastomer, the compositions of the present invention including polypropene or polybutene in an amount of at least 10% by weight are capable of swelling more than bentonite alone. After intimate admixture of the bentonite with the polypropene, polybutene or mixtures, additional additives such as tackifiers, viscocity modifiers, thickeners, extenders and the like may be added. The polypropene and/or polybutene add sufficient tackiness to the bentonite composition and completely wet-out the clay upon initial intimate mixing to prevent bentonite inhibiting additives from substantially inhibiting the swelling properties of the bentonite. Further, the polypropene and/or polybutene components of the composition of the present invention do not dry out over substantial periods of time in addition to providing the new and unexpected increase in swelling capacity of the bentonite. Additionally, the capacity for polypropene and polybutene to wet-out the bentonite enables a bentonite composition to contain 85-90% bentonite with 10-15% polypropene and/or polybutene while maintaining the tackiness and cohesive handleability of the composition.

In accordance with another embodiment of the present invention, the composition includes a water-swellable clay, such as bentonite, an elastomer, such as partially cross-linked butyl rubber, and a plasticizer compatible with the elastomer. The elastomer is capable of stretching with the clay upon hydration.

Accordingly, an object of the present invention is to provide a non-hydrated, cohesive bentonite composition containing bentonite clay, polypropene and/or polybutene having new and unexpected swelling capabilities.

Another object of the present invention is to provide a method of manufacturing a non-hydrated, cohesive bentonite composition containing bentonite clay, polypropene and/or polybutene having new and unexpected swelling capabilities.

Still another object of the present invention is to provide a non-hydrated, cohesive bentonite composition having new and unexpected structural integrity for manufacture in rope form or other desired shapes including bentonite, polypropene and/or polybutene and an elastomer.

A further object of the present invention is to provide a method of manufacturing a non-hydrated, cohesive bentonite composition having new and unexpected structural integrity for manufacture in rope or other shaped forms including bentonite, polypropene and/or polybutene, and an elastomer.

Another object of the present invention is to provide an article of manufacture comprising 35 to 90% by weight bentonite and 10 to 65% by weight polypropene, polybutene or mixture.

Still other objects of the present invention are to provide bentonite-elastomer compositions, articles and method of manufacturing including combining bentonite, an elastomer, and a plasticizer compatible with the elastomer resulting in a composition and articles having extremely good structural integrity wherein the bentonite is not substantially inhibited from swelling.

BRIEF DESCRIPTION OF THE DRAWING

FIG. 1 is a schematic view of the apparatus used to manufacture the composition and articles of the present invention;

FIG. 2 is a perspective view of the composition of the present invention formed into an elongated, rectangular shape;

FIG. 3 is a perspective view of a rectangular block of the composition of the present invention prior to hydration;

FIG. 4 is a perspective view showing the composition block of FIG. 3 after hydration;

FIG. 5 is a partially broken-away schematic drawing of the apparatus and composition used to manufacture the article of FIG. 6; and FIG. 6 is a partially broken-away perspective view of a sheet-like article of the present invention.

DETAILED DESCRIPTION OF THE PRESENT INVENTION

In accordance with the present invention, a water swellable clay intimately mixed with a polypropene, a polybutene or a mixture of polypropene and polybutene will provide a bentonite composition having a desired consistency ranging from a soupy liquid to a relatively stiff putty-like and tacky solid and having new and unexpected capacity for swelling. The water swellable clay, for example bentonite, is included in the composition in an amount of about 35% to about 90% by weight and the polypropene and/or polybutene is included in the composition in an amount of about 10% to about 65% by weight of the composition.

To achieve the full advantage of the present invention, the composition should include polypropene, polybutene or mixtures thereof in an amount of at least 15% by weight. Additional tackifiers compatible with the polypropenes or polybutenes may be included for additional tack so long as the polypropene, polybutene or mixture is included in at least 10% by weight of the composition. Additional compatible tackifiers may include, for example, aliphatic petroleum hydrocarbon resins such as polyisobutylene, polyterpenes, hydrogenated resins, and mixed olefins. Generally, aromatic tackifiers are not suitable since they will bleed to the surface of the composition and separate thereby reducing the handleability and consistency of the composition. Other additives such as viscosity controlling agents, fillers, tackifiers and the like may be added in a total amount up to about 20% by weight of the bentonite composition to impart any desired physical characteristics to the composition. However, it has been found that the addition of a silicic filler, e.g. silicic acid or calcium silicate, substantially decreases the water-swellability of the compositions of the present invention. Accordingly, essentially no silicic filler should be added to the composition. Silicic filler added in an amount of only 1% by weight reduces the water swellability of the compositions by about 10% and 5% by weight added silicic filler reduces the water swellability by about 20%. To achieve the full advantage of the present invention, the silicic filler, if any, should be 1% by weight or less.

Evaporative solvents such as mineral spirits may be added to the composition of the present invention to aid in mixing, but it is preferred to combine the composition components without such solvents. In any case, the polypropene, polybutene or mixtures should be present in the final composition, after evaporation of any solvents volatizable under ambient conditions, in an amount of at least 10% by weight.

In accordance with an important feature of the present invention, no additives are necessary to pro-tect the swellable clay, polypropene and/or polybutene composition of the present invention since the polypropenes and polybutenes will completely wet out the bentonite in amounts up to about 90% by weight bentonite without inhibiting the swelling characteristics of the bentonite. Quite unexpectedly, the polypropene and/or polybutene component increases the capacity of the bentonite to swell while providing sufficient tack so that the composition easily can be adhered to substantially any surface over extended periods of time.

The water-swellable colloidal clay utilized in the present invention is any water swellable colloidal clay which will hydrate in the presence of water, i.e., will swell in the presence of water. In accordance with one important embodiment of the present invention, the colloidal clay is bentonite. A preferred bentonite is sodium bentonite which is basically a hydratable montmorillonite clay of the type generally found in the Black Hills region of South Dakota and Wyoming. This clay has sodium as a predominant exchange ion. However, the bentonite utilized in accordance with this embodiment of the present invention may also contain other cations such as magnesium and iron. There are cases wherein a montmorillonite predominant in calcium ions can be converted to a high swelling sodium variety through a well known process called "peptizing". The colloidal clay utilized in this invention may be one or more peptized bentonites. The colloidal clay may also be any member of the dioctahedral or trioctahedral smectite group or mixtures thereof. Examples are Beidellite, Nontronite, Hectorite and Saponite. The colloidal clay, i.e., bentonite, generally is finely divided as known for use in water barrier panels and the like, i.e, 150 to 350 mesh.

The polybutenes used in accordance with the principles of the present invention, generally comprise $(C_4H_8)_n$ where n ranges from about 6 to about 45 having average molecular weights in the range of about 300 to about 2,500. The commercially available useful polybutenes are predominantly of high molecular weight mono-olefins and can include 100% of the polybutene or include up to about 10% isoparaffins. The polybutenes are chemically stable, permanently fluid liquids and their tackiness increases with increased molecular weight. The viscosities of the polybutenes range from a consistency of a light oil to a highly viscous fluid having a viscosity range of about 25 to about 4,000 centipoises. The lower viscosity polybutenes can be combined with a water-swellable clay to provide a composition having a soupy consistency which is very tacky and difficult to handle depending upon the quantity of bentonite included within the composition of the present invention.

The polypropenes useful in accordance with the principles of the present invention generally comprise $(C_3H_6)_n$ where n ranges from about 7 to about 60 having molecular weights in the range of about 300 to about 2,500. The commercially available propropenes useful in accordance with the present invention generally are amorphous in character and may be combined with up to about 10% by weight of a suitable processing solvent, such as ligroin, although the propropenes may be blended with the bentonite easily at elevated temperatures i.e. 200° C. without a solvent.

To achieve the greatest swelling of the compositions of the present invention, the polypropene or polybutene or mixtures should be present in the composition in an amount of about 15% to about 30% by weight of the total composition.

In testing to determine if the polypropenes and polybutenes would inhibit the swelling characteristics of the swellable clay, two compositions were prepared in accordance with the present invention-the first containing approximately 78% bentonite and 22% polybutene and the second containing about 78% bentonite and 22% polypropene. For comparison, one gram of bentonite alone was placed in one graduated cylinder while one gram of the above two compositions of the present invention were placed in a second and third graduated cylinder. Each of the compositions were wetted and permitted to swell for about 48 hours. After complete swelling, it was found that the bentonite alone swelled to a volume of about 9 ml while the two compositions of the present invention containing polypropene or polybutene swelled to a volume of 10 ml.

In accordance with another important feature of the present invention, it has been found that the addition of an elastomer in an amount of about 1% to about 20% based on the total weight of the bentonite composition of the present invention will substantially increase the handleability of the composition without impeding its swellability. To achieve the full advantage of this embodiment of the present invention, the elastomer should be included in an amount of about 2% to about 10% based on the total weight of the composition. Suprisingly, it has been found that mastication or shearing, i.e. in a sigma blender, of a composition containing a water-swellable clay, such as bentonite, polypropene and/or polybutene, and an elastomer, actually increases the capacity of the composition to swell in an amount greater than the bentonite alone; and greater than the bentonite, polypropene/polybutene composition without the elastomer.

In testing the swellability of the bentonite compositions of the present invention including an elastomer, the two compositions prepared above (polybutene and polypropene) were blended separately in a sigma blender with 4.95% partially cross-linked butyl rubber to thoroughly masticate the butyl rubber into the compositions to form two homogeneous blends. One gram of each of the compositions containing 4.95% butyl rubber, 75.25% bentonite clay and 19.8% of polybutene or polypropene were placed in two graduated cylinders and submerged in water for approximately 48 hours to make sure that the compositions were completely swelled. When completely swelled, one gram of each composition containing the butyl rubber had swollen to approximately 13–14 ml—greater than the swelling which occurred with one gram of bentonite alone and greater than the swelling which occurred with the bentonite/polypropene or bentonite/polybutene compositions, although these compositions without elastomer actually included more bentonite. The compositions containing the butyl rubber were easily handleable and extrudeable to any desired shape and would retain their form when adhered to a surface for water seepage control.

Essentially any elastomer having at least 100% elongation and, in accordance with an important feature of the present invention having at least 500% elongation, can be used in the bentonite composition of the present invention to substantially improve the handleability, cohesiveness and structural integrity of the composition and articles manufactured. Partially cross-linked elastomers have been found to be most suitable in improving the consistency, handleability and structural integrity of articles requiring such properties, but elastomers which are not cross-linked are also useful, particularly those polymers which are capable of being lightly cross-linked when subjected to the heat generated within the blender, i.e. sigma blender, during mastication and mixing with the other composition components. Fully cross-linked elastomers generally are not suitable for incorporation into the compositions of the present invention since their elongation capacity is insufficient to permit full expansion of the bentonite during hydration. However, any elastomer having at least 100% elongation is suitable and included within the scope of the present invention.

To achieve the full advantage of the present invention, the elastomers should have an elongation of at least 500% to allow for the new and unexpected bentonite swelling discovered in accordance with the principles of the embodiment of the invention directed to intimately contacting bentonite with polypropene and/or polybutene. Another suitable elastomer includes polyisobutylene. Additional suitable elastomers for incorporation into the composition include styrene-butadiene, synthetic and natural rubbers, ethylene-propylene copolymers and terpolymers, halogenated butyl rubber, and partially cross-linked butyl rubbers having divinylbenzene added to form a terpolymer for the purpose of imparting a degree of "cure". The elastomer can be shredded prior to mastication with the bentonite and polypropenes and/or polybutenes to decrease mixing time although shredding is not necessary. Mastication and homogeneous flow of the elastomer throughout the bentonite composition can be achieved with the elastomer in any desired shape, i.e., pellet form, for example in a sigma blender.

In accordance with another important feature of the present invention, the bentonite compositions disclosed herein can include additives capable of forming a skin on the composition, such as a copolymer of vinyl toluene with a vegetable drying oil. The compositions containing skins are useful wherever the composition does not require tackiness for securing the composition to its intended location. If tackiness is desired, a surface coating of any suitable tackifier may be applied over the skin.

In accordance with still another important embodiment of the present invention, a water-swellable composition is provided including a water-swellable clay, such as bentonite, in an amount of 35–90% by weight, an elastomer in an amount of 1–20% by weight, and any plasticizer compatible with the elastomer and capable of plasticizing the elastomer, in an amount of 2–50% by weight based on the total weight of the composition.

The plasticizer improves the workability of the elastomer, extends the elastomer, enables the elastomer to re-position itself with expansion of the water swellable clay when the clay is wetted and wets the bentonite surface sufficiently to enable the elastomer to accept substantial amounts of bentonite (up to about 90%) and to provide a homogeneous bentonite distribution throughout the elastomer.

It has been found that an elastomer having an elongation of at least 100% will permit bentonite to substantially completely expand so long as the elastomer includes a plasticizer in an amount of at least 2% based on the total weight of the composition. The elastomer provides exceptionally good structural integrity to the composition without substantially inhibiting the swellability of the clay. The elastomers should be partially, but not completely, cross-linked and include, for example, butyl rubber, styrene-butadiene, other synthetic and natural rubbers, ethylene-propylene copolymers, ethylene and propylene terpolymers.

Suitable plasticizers are the relatively low polarity plasticizers including epoxidized oils, such as epoxidized soybean oil; alkyl monesters such as butyl oleate; long chain partial ether esters, such as butyl cellosolve oleate; long chain alkyl diesters, such as dioctyl adipate and dioctylphthalate; and petroleum-derived plasticizers such as aromatic-napthenic oils; napthenic-aromatic oils; napthenic-paraffinic oils; and paraffinic oil.

To achieve the full advantage of this embodiment of the present invention, the plasticizer should be included in the composition in an amount of at least 10% by weight of the composition to plasticize the elastomer and fully wet-out the bentonite. The plasticizers generally are included in an amount of 10–30%.

Turning now to the drawing, and initially to FIGS. 1 and 5, apparatus is illustrated in schematic form for extruding the compositions of the present invention into rod and sheet forms. The bentonite composition 12 comprising an intimate mixture of bentonite, with polypropene and/or polybutene in one embodiment, or with a plasticizer in another embodiment, is thoroughly blended in a homogeneous blend with an elastomer, such as butyl rubber, in sigma blender 14 to fully masticate the elastomer to provide a homogeneous bentonite composition into extruder 16. Auger 18 of extruder 16 forces the bentonite composition through a die opening 20 of any desired shape, for example the rod form shown in FIG. 2, to form a rectangular rope 22. The rope 22 is directed onto a conveyor 24 capable of being driven at a variety of predetermined speeds by conveyor motor 26. By varying the speed of the conveyor 24 relative to the speed at which the extruded rope 22 exits the die opening 20, the rope can be stretched or compressed slightly to vary the dimensions of the extruded clay composition. The conveyor 24 includes a suitable conveyor belt 28 and a continuous supply of release paper 30 directed over the conveyor belt 28 for contact against a surface of the rope 22 being extruded through the die opening 20 of extruder 16. The rope 22 on the release paper 30 is wound around a take up roller 32 as the rope is extruded onto the release paper to provide the composition in a coiled, rope-like form.

Similarly, as shown in FIG. 5, the extruder 16 can include an elongated die opening 34 to provide the composition in sheet form 22a, as shown in FIG. 6, and the sheets may be cut to length at a suitable cutting station (not shown) or formed into a sheet coil 35 as shown in FIG. 5. As shown in FIG. 5, the conveyor may include a second continuous supply of release paper 36 to sandwich the bentonite sheet between upper and lower release sheets. The second release paper supply 36 is particularly desirable for compositions not including an elastomer and compositions having less cohesiveness and structural integrity.

FIGS. 3 and 4 show a portion of the rope 22 of FIG. 2 comprising bentonite, polypropene and/or polybutene, and an elastomer before and after hydration. Quite unexpectedly, the relatively rectangular three-dimensional block 39 of FIG. 3, when hydrated, reproduced itself outwardly along every surface resulting in a central core or block having the approximate dimensions as shown in FIG. 3, surrounded by six additional blocks 40 having approximately the same dimensions. This capacity for the bentonite compositions containing polypropene and/or polybutene to maintain their capacity to swell outwardly from every surface is a very new and unexpected result in the art of water sealant compositions and is particularly useful where the composition includes an elastomeric material. The elastomeric material having at least 100% elongation is capable of stretching to flow with the expanding clay to form surrounding, individual swollen bentonite structures having relatively good structural integrity capable of entering any given fissures or other structural damage to seal a potential water seepage path.

I claim:

1. A water-swellable clay composition having essentially no silicic filler comprising water-swellable smectite clay in an amount of 35 to 90% by weight; and polypropene, polybutene or mixtures thereof in an amount of 10% to 65% by weight.

2. The composition of claim 1 wherein said polypropene, polybutene or mixtures thereof comprises 15 to 30% by weight.

3. The composition of claim 1 wherein said water-swellable clay comprises bentonite in an amount of 50 to 80% by weight.

4. A water-swellable clay composition consisting essentially of a water-swellable smectite clay in an amount of 35% to 90%, and polypropene, polybutene or mixtures thereof in an amount of 10% to 65% by weight.

5. The composition of claim 4 wherein said polypropene, polybutene or mixtures thereof comprises 15 to 30% by weight.

6. The composition of claim 1 further including an elastomer in an amount of 1% to 20% by weight.

7. The composition of claim 6 wherein said clay is bentonite in an amount of 50% to 80% by weight; wherein said elastomer comprises 2% to 10% by weight; and wherein said polypropene, polybutene or mixtures thereof comprises at least 16% by weight of the composition.

8. The composition of claim 7 wherein said elastomer has an elongation of at least 500%.

9. The composition of claim 8 wherein said rubber comprises partially cross-linked butyl rubber.

10. A shaped, water-expandable article of manufacture suitable for adhering to a surface of a substrate for water seepage content comprising water-swellable clay in an amount of 35 to 90% by weight; and polypropene, polybutene or mixtures thereof in an amount of 10% to 65% by weight extruded into a predetermined shape.

11. The shaped, water-expandable extruded article of manufacture of claim 10 further including an elastomer in an amount of 1% to 20% by weight and wherein said article of manufacture has essentially no silicic filler.

12. A method of manufacturing a water-swellable smectite clay composition comprising:
    intimately contacting a water-swellable smectite clay with polypropene, polybutene, or a mixture thereof to form a clay composition including 35% to 90% by weight clay, and 10% to 65% polypropene, polybutene or mixture thereof, and having essentially no silicic filler material.

13. The method of claim 12 further including homogeneously mixing an elastomer into said intimately contacted bentonite composition to provide a clay composition including 35% to 90% by weight smectite clay; 10% to 64% polypropene, polybutene or mixtures; and 1% to 20% elastomer.

14. The method of claim 13 wherein said clay comprises bentonite and wherein said polypropene, polybutene or mixtures comprises at least 16% by weight of said composition.

15. The method of claim 13 further including shaping said composition to a predetermined shape.

16. The method of claim 15 wherein said composition is shaped by extruding said composition through a die-opening and further including directing said extruded bentonite onto a travelling conveyor having a variable speed controllable to predetermine the dimensions of said extruded clay composition.

17. The method of claim 13 further including depositing said clay composition onto a release paper and coiling said composition on said release paper into the form of a coiled rope.

18. A water-swellable composition consisting essentially of a water-swellable smectite clay in an amount of 35% to 90% by weight; an elastomer in an amount of 1% to 20% by weight; and polypropene, polybutene or mixtures thereof in an amount of 2% to 50% by weight of the composition.

* * * * *

UNITED STATES PATENT AND TRADEMARK OFFICE
CERTIFICATE OF CORRECTION

PATENT NO. : 4,534,926
DATED : Aug. 13, 1985
INVENTOR(S) : Todd D. Harriett

It is certified that error appears in the above–identified patent and that said Letters Patent are hereby corrected as shown below:

Col. 10, line 4, before "clay" delete "smectite";

line 7, before "clay" insert --smectite--.

Signed and Sealed this

Fourteenth Day of October, 1986

[SEAL]

Attest:

DONALD J. QUIGG

Attesting Officer  Commissioner of Patents and Trademarks